cv
2,977,357
PROCESS FOR PREPARING A THICK-THICK BOILING STARCH DERIVATIVE

John E. Voigt, Raymond J. Horst, and Ernest A. Sowell, all of St. Louis, Mo., assignors to Anheuser-Busch, Inc., St. Louis, Mo., a corporation of Missouri No Drawing. Filed Aug. 14, 1958, Ser. No. 754,928

2 Claims. (Cl. 260—233.3)

The present invention relates generally to starch derivatives, and more particularly to a novel high viscosity starch product and to a novel method for producing it from unmodified starch.

Specifically the present invention pertains to a thick-thick boiling starch prepared from unmodified starch using potassium pyroantimonate as the principal reactant.

So called thin boiling starches, thick boiling starches and thick-thick boiling starches are used in the paper, textile, confectionary, rubber and other industries. Thick-thick boiling starches differ from the others principally in that their cooked pastes are more viscous.

An object of the present invention is to provide a novel thick-thick boiling starch and a novel method of producing same from unmodified starch using a small amount of reactant. Another object is to provide a novel thick-thick boiling starch in granule form which forms a high viscosity paste, and a novel method for producing same from unmodified starch (such as obtained from corn) utilizing a pentavalent antimony compound which is capable of forming cross links between the hydroxyl groups of the starch molecules. A further object is to provide a novel thick-thick boiling starch and a method for producing same from unmodified starch employing potassium pyroantimonate.

Briefly, the present invention comprises reacting a relatively small amount of potassium pyroantimonate with unmodified starch under controlled conditions of pH and temperature to produce a water soluble thick-thick boiling starch product. A detailed description of the present invention follows:

A slurry of unmodified starch granules consisting of about 40% by weight of starch and 60% by weight of water is provided. The starch solids content of the slurry is not critical and may be varied if necessary. However, a slurry having a starch content of approximately 40% starch is most often met with in industrial practice because of the economies of handling.

A selected quantity of the reactant, potassium pyroantimonate, is added to the slurry and allowed to react. The slurry is then filtered and washed. The resulting starch cake is dried to a moisture content of approximately 10%. When the dry starch is reslurried in water and cooked, it will give a paste having a higher than normal viscosity.

The starch granules are kept in suspension by agitation and the temperature is adjusted to about 120° F. A base or an acid may be used for adjustment of the slurry pH to any value ranging between about 3.0 to 8.0 if desired. The reaction also proceeds readily at a pH of 4 to 5 which is the usual pH range of commercial unmodified corn starch slurries.

Thus we have provided a novel thick-thick boiling starch product in granule form, which only requires that the consumer cook it in water to obtain the desired thick-thick boiling characteristics.

In the past potassium pyroantimonate has been added to starch pastes for the purpose of insolubilizing the starch. While such a reaction is suitable for producing insoluble coatings upon various materials, the coating composition so produced cannot be reused once it has dried. The novel starch product produced by the reaction of the present invention can be shipped in a dried granule state to the ultimate user, stored by him and then mixed with water and cooked as it is needed. This new and unexpected feature is believed to result from the extremely small amount of potassium pyroantimonate used and from the controlled pH and temperature of the reaction.

We have found that the amount of potassium pyroantimonate used has a controlling effect upon the properties of the final product. If too much is used, an insoluble, non-swelling starch derivative is produced which will not disperse when cooked with water; and if too little is used, the starch product will not have the desired viscosity of a thick-thick boiling starch.

The reaction proceeds within a pH range of from about 3 to about 8. The pH influences the reaction and the potential viscosity effect of the resulting modified starch. Other variables such as reaction time and temperature also condition the degree of viscosity increase of the final product. It has been determined that the reaction proceeds over a wide temperature range. However in commercial practice a temperature of approximately 120° F. is most suitable. Temperatures above 130° F. lead to swelling and gelatinization of the starch granules resulting not only in undesirable manufacturing conditions but also in undesirable side effects on the final product. Lower temperatures retard the reaction and also introduce manufacturing difficulties.

After the reaction is completed, the treated starch slurry is diluted with water to approximately 28% solids, filtered, washed, dried, and packaged. The consumer has then only to cook the product with water to obtain the high viscosity paste desired.

For evaluation of the cooked paste viscosities of starch, the Corn Industries Research Foundation's viscometer was used. The instrument incorporates features for measuring the pasting characteristics of starches under controlled condition of cooking. The viscosities are expressed as gram-centimeters of torque. The viscosity of different batches of unmodified starch, when cooked, is not always uniform. This viscosity variation is due to characteristics of the corn from which the starch was processed as well as manufacturing conditions. For comparison purposes, a treated starch having an increase of 20 g.-cm. or greater over the value obtained for an untreated starch was considered to be a thick-thick boiling starch.

For purposes of illustrating the teachings of this invention, the following examples are cited:

Example No. 1

A of unmodified corn starch containing approximately 43% by weight starch was agitated and heated to a temperature of about 120° F. The pH of the slurry was adjusted to a value of 6.5–7.0 by the addition of $Na_2CO_3$. An amount of the reactant, potassium pyroantimonate, equivalent to 1% based on the starch was then added and allowed to react. After three hours time the slurry was diluted with water to approximately 28% starch. The diluted slurry was filtered in order to collect the starch. The starch was dried to a moisture content of approximately 10%. The viscosity of a 5% (by weight) cooked paste as determined by means of the Corn Industries Research Foundation viscometer was 433 g.-cm. higher than that obtained on the unmodified starch control.

Example No. 2

A slurry of unmodified corn starch containing approximately 43% by weight starch was agitated and heated to a temperature of about 120° F. The pH of the slurry was adjusted to within the range of 6.5–7.0 by the addition of $Na_2CO_3$. An amount of the reactant, potassium pyroantimonate, equivalent to 0.01% based on the weight of the starch in the slurry was added and allowed to react. After three hours time the slurry was diluted with water to approximately 28% starch solids. The diluted slurry was filtered in order to collect the starch. The starch was dried to a moisture content of approximately 10%.

The viscosity of a 5% (by weight) cooked paste as determined by the Corn Industries Research Foundation viscometer was 49 g.-cm. higher than the unmodified starch control.

*Example No. 3*

A slurry of unmodified corn starch containing approximately 43% by weight starch was agitated and heated to a temperature of about 120° F. The pH of the slurry in this case was 4.0 and it was not adjusted. The reactant, potassium pyroantimonate, was added in a quantity equivalent to 0.02% based upon the weight of the starch in the slurry. After a three hour reaction period the starch slurry was diluted to approximately 28% solids and filtered. The starch was dried to a moisture content of approximately 10%.

The viscosity obtained on a 5% (by weight) cooked paste by means of the Corn Industries viscometer was 45 g.-cm. higher than the control.

*Example No. 4*

A slurry of unmodified corn starch containing approximately 43% by weight starch was agitated and heated to a temperature of approximately 120° F. The pH of the slurry was adjusted to a value of 9.0. An amount of potassium pyroantimonate equal to 0.02% based upon the weight of the starch in the slurry was added. At the end of three hours the pH was adjusted to 6.0. The slurry was then diluted to about 28% solids and filtered. The starch was dried to approximately 10% moisture.

The viscosity of a 5% (by weight) cooked paste as determined by the Corn Industries viscometer was 165 g.-cm. higher than the unmodified control starch.

*Example No. 5*

A slurry of unmodified corn starch containing 43% by weight of starch was agitated and heated to a temperature of 120° F. The pH was adjusted to a value of 2.0. The quantity of the reactant, potassium pyroantimonate, used in this example was 0.03% based upon the weight of the starch in the slurry. After three hours reaction time the pH was adjusted to 6.0. The slurry was then diluted to about 28% starch and filtered. The starch was dried to a moisture of about 10%.

The viscosity of a 5% (by weight) cooked paste of this starch was 68 g.-cm. higher than the control.

Thus, after considering the various examples, it is seen that an amount of potassium pyroantimonate as little as about 0.01%, by weight based on the weight of starch, when reacted with a starch slurry will produce an appreciable increase in the viscosity of the final starch product. The resultant increase in viscosity of this starch product increases as the amount of potassium pyroantimonate added is increased. When more than about 1% potassium pyroantimonate, by weight based on the weight of starch, is reacted with the starch slurry an undesirable insoluble starch product is formed which does not have the desired granular form characteristic of products formed utilizing the present invention. A range of potassium pyroantimonate of from about 0.01% to about 0.1%, by weight based on the weight of starch, is preferred to be added to a starch slurry to give the most desirable granular starch derivative.

Similarly, the pH of the reaction may vary from about 2 to about 9 and still give a viscosity increase in the final product, although a pH from about 3 to about 8 gives a more satisfactory product and a pH of from about 5 to about 7 is the preferred range. When the pH of the reaction is above about 8.0 it is desirable to lower it to about 6.0 in order to achieve the preferred final product. As the pH is increased to about 8.0 the viscosity of the final product increases, but as the pH further increases the final product viscosity goes down unless the pH is adjusted back to a value of about 6.0.

The time of reaction is not critical and may be varied as desired.

By adjusting the pH of the starch slurry with sodium carbonate, a final product is produced having the highest viscosity for the amount of potassium pyroantimonate used. Specifically, the most desired modified starch products result from using a starch slurry adjusted to a pH of about 5, 6 or 7 with sodium carbonate and from about 0.01% to about 0.1% potassium pyroantimonate.

Thus it is apparent that there has been provided novel thick-thick boiling starches in granule form which have the potential of giving a thicker, more viscous paste on cooking than ordinary unmodified corn starch, and a novel method for producing it which fulfills all the objects and advantages sought therefor.

Potassium pyroantimonate has this exceptional and surprising type reactivity with unmodified starch in water suspension when a relatively very small amount is added to the starch slurry.

This invention is intended to cover all changes and modifications in the present examples of the inventions herein chosen for the purposes of the disclosure, which do not constitute departures from the spirit and scope of the invention.

What is claimed is:

1. A process for making a thick-thick boiling starch derivative in granule form including the steps of reacting from about 0.01% to about 1% potassium pyroantimonate by weight based on the weight of starch with an unmodified starch slurry, maintaining the reaction at a temperature of between 32° F. and about 130° F., and drying the resulting compound to recover a water dispersible starch derivative in granular form, said dry starch derivative when reslurried in water and cooked producing a paste with a higher viscosity than a paste made from unmodified starch.

2. A process for producing a granular starch derivative which can be converted into a thick-thick pasting mass when cooked with water, comprising providing an unmodified starch slurry, reacting therewith from about 0.01% to about 0.1% potassium pyrontimonate by weight based on the weight of starch, maintaining the reaction at a pH of from about 5 to about 7 and a temperature between 32° F. and about 130° F., and drying the resulting compound to recover a water dispersible cross-linked starch derivative in granular form.

References Cited in the file of this patent

UNITED STATES PATENTS

| | | |
|---|---|---|
| 2,343,898 | Griffin et al. | Mar. 14, 1944 |
| 2,381,578 | Griffin et al. | Aug. 7, 1945 |
| 2,773,057 | Hjermstad et al. | Dec. 4, 1956 |
| 2,805,220 | Gerwitz | Sept. 3, 1957 |